United States Patent [19]

Kuchler

[11] 4,217,650

[45] Aug. 12, 1980

[54] AUTOMATIC SAUSAGE SLICING AND WEIGHING SYSTEM

[75] Inventor: Fritz Kuchler, Klagenfurt, Austria

[73] Assignee: Brain Dust Patents Establishment, Vaduz, Liechtenstein

[21] Appl. No.: 911,289

[22] Filed: May 31, 1978

[30] Foreign Application Priority Data

Jun. 1, 1977 [AT] Austria ................................ 3858/77

[51] Int. Cl.[2] ........................ B26D 4/56; G01G 19/40

[52] U.S. Cl. .................................... 364/567; 364/475; 83/73; 83/77; 83/713

[58] Field of Search ..................... 364/475, 567; 83/69, 83/73, 77, 713, 714

[56] References Cited

U.S. PATENT DOCUMENTS

| | | | |
|---|---|---|---|
| 3,476,198 | 11/1969 | Francis | 83/77 X |
| 3,642,046 | 2/1972 | Mathews, Jr. et al. | 364/475 X |
| 4,065,911 | 1/1978 | Fagan | 83/73 X |
| 4,114,492 | 9/1978 | Skidmore | 83/69 X |
| 4,118,777 | 10/1978 | Wallace | 364/75 |
| 4,136,504 | 1/1979 | Wyslotsky | 83/77 X |

*Primary Examiner*—Edward J. Wise

*Attorney, Agent, or Firm*—Montague & Ross

[57] ABSTRACT

A slicing and measuring apparatus for sausage and the like has a table which supports the foodstuff to be sliced and is displaceable back and forth adjacent a blade which is continuously rotated by an electric motor. The motor speed or current consumption is monitored to ascertain when the blade engages the foodstuff being sliced, and similarly the position of the table is monitored by means of a potentiometer. Thus it is possible to determine the diameter of the slice being produced, to square it and multiply it by an appropriate $\pi$ containing factor and by the known thickness of the slice to determine the volume thereof. Thereafter this volume is mulitplied by the density of the foodstuff to determine the weight of the slice and the weight of successive slices can be added to determine the total weight sliced.

15 Claims, 1 Drawing Figure

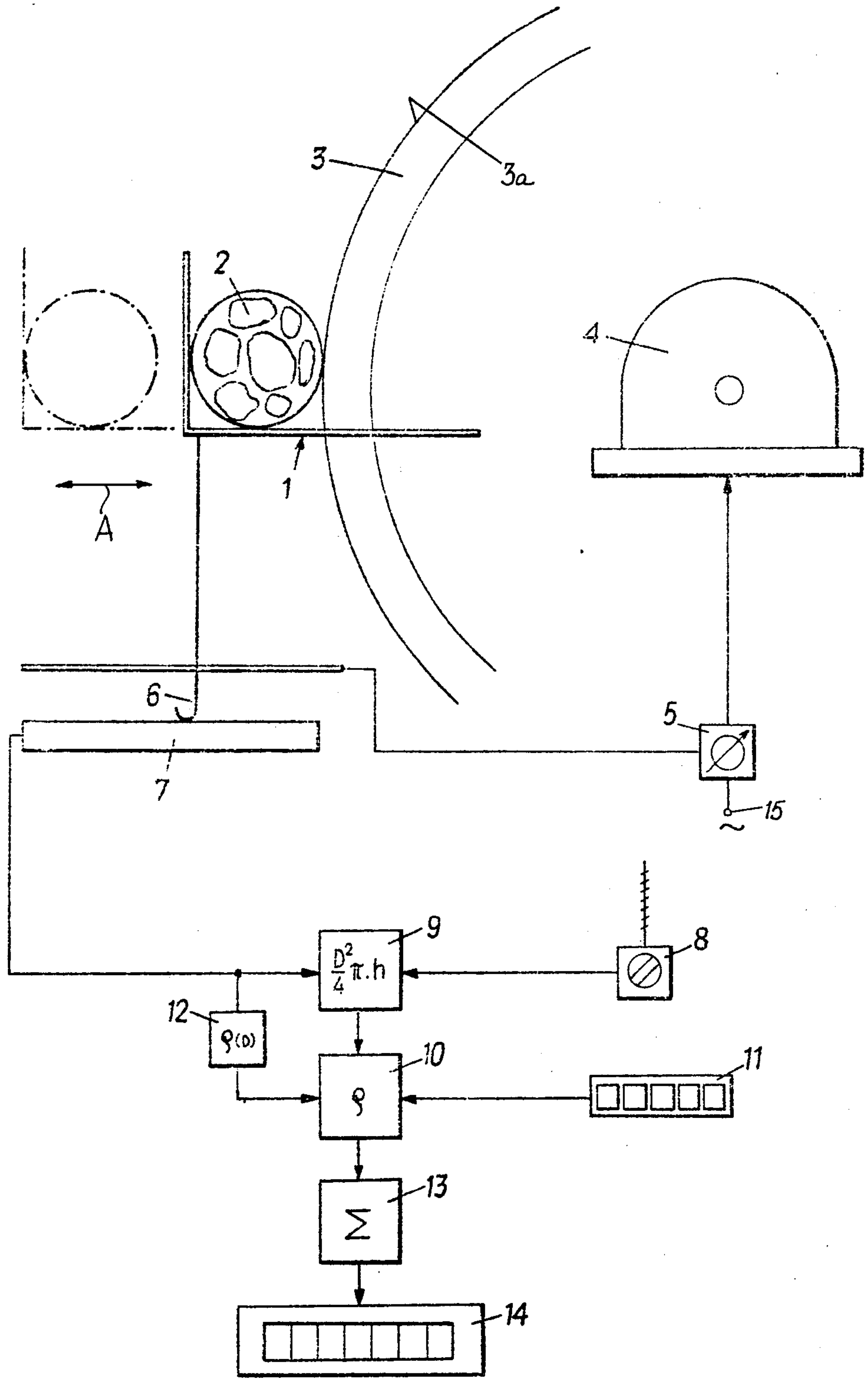
3
3a
2
4
A
1
6
7
5
15
9
$\frac{D^2}{4}\pi.h$
8
12
ρ(D)
10
ρ
11
13
Σ
14

AUTOMATIC SAUSAGE SLICING AND WEIGHING SYSTEM

FIELD OF THE INVENTION

The present invention relates to a method of and apparatus for automatically slicing and weighing sausage. More particularly this invention concerns such an apparatus used in the retail trade for preparing packages of sliced cold cuts.

BACKGROUND OF THE INVENTION

In the retail trade it is standard practice for a customer to order, for example, a quarter pound of sliced salami. In a shop selling fresh products the vendor normally then places the whole salami onto the slicing machine, sets the machine to produce slices of the requested or standard thickness for the particular cold cut, and cuts off a number of slices whose aggregate weight the vendor judges to be approximately the requested weight. During this procedure the vendor, especially when not highly experienced, interrupts the slicing operation to set the already cut slices down on the scale to verify the weight. Such a procedure is time consuming and, therefore, uneconomical.

Machines are also known, such as described in my copending and commonly assigned application Ser. No. 901,710 filed 1 May 1978 and in my jointly filed application Ser. No. 911,290, whose entire disclosures are herewith incorporated by references, which automatically form a succession of slices and even deposit this succession of slices on a support table in a plurality of rows, with the slices in each row being offset to each other and each row being offset to the adjacent rows. Even in such an automatic apparatus, however, the vendor is normally required to interrupt the automatic operation to make sample weighings to check if the quantity of slices has the proper weight. Each time the operation is interrupted valuable time is lost and the array of slices on the support table is not usually replaced in the exact position for production of an attractive and uniform array.

Another machine is known which produces a succession of slices all of approximately the same volume. This machine has a pair of feelers, one of which measures the diameter of the foodstuff—sausage, cheese, meat—and the other of which measures the thickness of the slices. The machine is set up automatically to increase the thickness when the width or diameter decreases and vice versa. Such a machine can, therefore, be set up to produce a succession of slices of approximately uniform volume. Since the density, that is the ratio of mass to volume, of a given foodstuff in normally constant, the machine can therefore produce slices of approximately uniform weight so that a given number of slices can normally be expected to have a given weight. The disadvantage of such a machine, however, is that slices of nonuniform thickness are produced which often render them wholly unusable for various purposes, such as sandwich making.

Other prior-art arrangements can be seen in Austrian Pat. Nos. 324,974 and 328,317, in Swiss Pat. Nos. 326,939 and 376,381, and in U.S. Pat. Nos. 3,142,323 and 3,220,498.

OBJECTS OF THE INVENTION

It is therefore an object of the present invention to provide an improved method of and apparatus for slicing and measuring a foodstuff.

Another object of this invention is to provide a slicing and measuring system which allows the total weight of the slices cut to be determined at any time during the slicing operation.

Yet another object is to provide such an arrangement which allows continual monitoring of the aggregate weight of the slices in a particular sequence even in combination with a depositing machine such as described in my above-cited copending applications Ser. Nos. 901,710 and 911,290

SUMMARY OF THE INVENTION

These objects are attained according to the instant invention in a slice-measuring method comprising the steps of supporting a foodstuff to be sliced on a table adjacent a blade and relatively displacing the table and the blade in a predetermined stroke direction past each other to cut a slice from the foodstuff. An output is generated when the blade engages into and cuts the foodstuff and the relative position of the table and blade is continuosly monitored. The monitored relative position is signaled on generation of the output indicating contact of the blade with the foodstuff being sliced.

This method therefore determines the width of the slice measured generally in the plane of the slice. Determination of the surface area therefrom is a relatively easy matter, simply by squaring the width if the foodstuff is squre or by squaring the width and then multiplying it times a factor equal to $\pi/4$. The resultant product is equal to the surface area which can be multiplied by the thickness to obtain the volume. Since the typical foodstuff handled by this invention—sausage, cheese, or the like—has a uniform density it is possible thereafter to multiply this volume by the density to determine the weight of the slice.

The slicing machine can be set up according to this invention to determine the weight of each slice in the manner described above and to add all of the thus determined weights in a given sequence to ascertain the overall weight of a plurality of slices. These determined weights can be displayed so that if the butcher is, for instance, asked for a quarter pound of thinly sliced roast beef, he need merely set the slicing machine to product thin slices, and then stop the slicing operation when the display for aggregate weight indicates a quarter pound. In practice it has been found that the method according to the present invention extremely closely approximates the actual weight of the material being sliced.

Another advantage of this invention is that the foodstuff being sliced, in particular in sandwich-making or other contexts where the exact weight is not absolutely critical, can be deposited by the slicing machine directly into the hand of the vendor, onto a piece of bread, or onto a platter. Thus even a relatively unskilled person can, for instance, prepare a sandwich using a relatively accurately determined quantity of meat or can prepare a buffet platter wherein, once again, the quantities of foodstuffs used are closely controlled.

According to further features of the instant invention, the slicer has a blade which is continuously rotated by an electric motor. The foodstuff being sliced is supported on a table adjacent the blade and is associated with automatic means with periodically displace the table past the cutting edge of the blade and which also step or index the table perpendicular to the slicing direction between each slicing operation. This table is connected to the wiper of a potentiometer. Furthermore a current or speed sensor is associated with the motor. As the cutting edge bites into the foodstuff the blade will be slowed or loaded slightly. The extra loading during the cutting operation as compared to when the blade is free running can be seen by the current detector as an increase in current consumption, whereas a speed detector can simply determine that the blade has slowed down somewhat. A pulse produced by this detector when it ascertains that the blade has contacted the foodstuff being sliced can be fed through the potentiometer connected to the table to produce a width signal pulse having a height directly proportional to the diameter of radius of the slice. Thereafter in accordance with the above-described mathematical operations, which can be carried out in very simple matter electronically, the weight of the slices is determined.

It is also possible in accordance with this system to link the above-described system with an automatic depositing device. In such an arrangement the depositing apparatus is arranged between the slicing blade and a table. Means is provided for arraying the separate slices in a plurality of rows, with the slices being offset in each row by a predetermined first distance and the rows being offset from each other by a predetermined second distance. The above-mentioned width-signal pulse is used to establish these two offset distances for production of an array wherein the overlap of slice to slice and of row to row is calculated in accordance with slice size.

BRIEF DESCRIPTION OF THE DRAWING

The sole FIGURE of the drawing is a schematic view of the system according to this invention.

SPECIFIC DESCRIPTION

As shown in the drawing a table 1 reciprocal in a horizontal direction A carries a cylindrical sausage 2 elongated horizontally in a direction perpendicular to direction A. A circular cutting blade 3 has a cutting edge 3*a* and is driven by an electric motor 4 connected via a current sensor 5 to a source 15 of electrical power, here line voltage.

The table 1 is connected to the wiper 6 of a potentiometer 7 of the slide type. This wiper 6 is connected to the current detector 5 which is set up to generate a pulse of a predetermined height whenever the motor 4 is loaded and its current consumption increases. The potentiometer is set up so that its resistance will be directly proportional to the relative position of the table 1 and blade 3, in this case as the table 1 approaches the blade 3 the resistance of the potentiometer will increase.

The potentiometer 7 is further connected to a multiplying circuit 9 which takes the incoming signal that corresponds to the pulse generated by the detector 5 attenuated by the resistance of the potentiometer 7 and multiplied by a factor of $\pi/4$ and by another factor h equal to the thickness of the slice and fed in by a setable input device 8. The output of the multiplying stage 9 is fed to another multiplying stage 10 wherein the product produced by the multiplier 9, which is substantially equal to the volume of the slice being produced, is multiplied by a factor $\rho$ equal to the density of the foodstuff being sliced. This factor $\rho$ is fed in from an input keyboard 11 and is determined by the type of foodstuff. It is also possible to derive this factor $\rho$ from a memory 12 which knows the density for each foodstuff and is capable of feeding to the multiplier 10 the proper factor $\rho$ for the foodstuff being cut.

Finally the product produced by the multiplier 10 is fed to an adder 13 where a sum $\Sigma$ is produced that is displayed on an alphanumeric readout 14. Thus as slices are cut off the foodstuff 1 the display 4 will indicate the total weight of slices produced.

I claim:

1. A slice-measuring and -weighing method comprising the steps of:
   - supporting a foodstuff to be sliced on a table adjacent a blade;
   - relatively displacing said table and said blade in a predetermined stroke direction past each other to cut a slice from said foodstuff;
   - generating an output when said blade engages into and cuts said foodstuff;
   - continuously monitoring the relative positions of said table and said blade in said stroke direction;
   - generating a width output corresponding to the relative position of said table and said blade on generation of said output and proportional to the width of the cut slice measured in said stroke direction;
   - generating a thickness output corresponding to the thickness of said cut slice measured in a direction perpendicular to said stroke direction;
   - generating a density output corresponding to the weight/volume density of said foodstuff; and
   - combining said width and thickness outputs mathematically to form a volume output corresponding to the volume of said cut slice and combining said volume output with said density output to determine the weight of said cut slice.

2. The method defined in claim 1, further comprising the step of displacing said blade during relative displacement of said blade and said table, whereby the resistance to displacement of said blade increases as same engages into and cuts said foodstuff, said resistance to displacement being monitored to generate said width output.

3. The method defined in claim 1 wherein said blade is displaced by an electric motor whose current consumption varies with said resistance to displacement, said current consumption being continuously monitored to generate said width output.

4. The method defined in claim 1 wherein said width and thickness outputs are combined mathematically by:
   - squaring said width output;
   - multiplying the squared width output by a constant to form a product; and
   - multiplying said product by said thickness output to determine said volume.

5. The method defined in claim 4 wherein said volume and density output are combined by multiplying one of said products by said volume.

6. The method defined in claim 4 wherein said foodstuff is centered on an axis generally parallel to said stroke direction and is of generally circular section, said factor being $\pi/4$.

7. A foodstuff slicing and measuring apparatus comprising:
   - a table adapted to support a foodstuff to be sliced;
   - a blade on said table;
   - means for relatively displacing said table and said blade in a predetermined stroke direction and thereby cutting a slice from said foodstuff;

means for measuring said slice and determining the area of a surface thereof;

means for multiplying said surface area by the thickness of said slice and by the density of said foodstuff for determining the weight of said slice.

8. The apparatus defined in claim 7 wherein said foodstuff in generally cylindrical and has an axis generally perpendicular to said direction, said means for measuring and determining including means for measuring a radially extending dimension of said slice, squaring said dimension, and multiplying the squared dimension by a factor.

9. The apparatus defined in claim 8 wherein said dimension is the diameter and said factor is $\pi/4$.

10. The apparatus defined in claim 7 further comprising means for adding the weights of successively cut slices.

11. The apparatus defined in claim 7 wherein said means for measuring and determining includes:

means for generating an output when said blade engages into and cuts said foodstuff;

means for continuously monitoring the relative positions of said table and said blade in said stroke direction; and means for signaling the monitored relative positions of said table and said blade on generation of of said output to said means for multiplying.

12. The apparatus defined in claim 11 wherein said means for continuously monitoring includes a potentiometer.

13. The apparatus defined in claim 11, further comprising means including an electric motor for displacing said blade during relative stroking of said blade and said table, said means for generating an output including means for detecting current consumption by said motor.

14. The apparatus defined in claim 11, further comprising means including a motor for rotating said blade during relative stroking of said blade and said table, said means for generating an output including means for engagement of said blade with said foodstuff.

15. The apparatus defined in claim 7 wherein said table is shiftable on said support past said blade.

* * * * *